United States Patent [19]

Bey et al.

[11] 4,194,838
[45] Mar. 25, 1980

[54] DIGITAL COLOR DENSITOMETER AND EXPOSURE METER

[76] Inventors: Michael P. Bey; Paul P. Bey, both of 4909 Abbott Dr., Temple Hills, Md. 20031

[21] Appl. No.: 764,894

[22] Filed: Feb. 22, 1977

[51] Int. Cl.$^2$ .............................................. G01J 3/50
[52] U.S. Cl. ................................... 356/404; 356/226; 356/227; 356/443
[58] Field of Search ............... 356/175, 202, 203, 226, 356/227, 404, 443, 444

[56] References Cited

U.S. PATENT DOCUMENTS 3,856,413  12/1974  Bey et al. ............................. 356/202

*Primary Examiner*—Vincent P. McGraw

[57] ABSTRACT

A photometric device for measuring and displaying by digital means primary color densities of a color negative to be printed to determine densities of color compensating filters. Exposure time, including reciprocity effect compensation for the photographic paper, is displayed digitally and determined by density measurements of the projected image.

A reference area of a color negative illuminated by light through color compensating filters is projected on the aperture of a probe which directs light through a light guide to a photodetector. The resulting photocurrents generate voltages amplified by a first and second variable gain linear amplifier. The second amplifier provides primary color and exposure density reference by means of gains stored by measurement of a standard negative. Digital display means is provided to display memory gains for accurately modifying or resetting reference gains. The output of the second amplifier is coupled to a signal integrator alternately gated by a pulse generator and an exposure-time controlled integrator. A voltage comparator and digital circuitry coupled to the signal integrator serve to display the density of color compensation negative optical density representative of a particular print reflectivity.

The exposure-time integrator is coupled to a voltage comparator which gates digital counters to display exposure time including compensation for reciprocity effects. An alternative exposure-time circuit utilizes analog means to display exposure time.

14 Claims, 6 Drawing Figures

DIGITAL COLOR DENSITOMETER AND EXPOSURE METER

BACKGROUND OF THE INVENTION

The present invention relates to a rapid and accurate photometric means for displaying exposure time by digital or analog displays, wherein the exposure time is determined by an associated density measurement of a projected negative and said exposure time includes reciprocity compensation for the photographic paper, and wherein said density measured and displayed by digital means is representative of a particular print reflectivity. Further photometric means relate to measuring and displaying by digital means, the optical densities of compensating filters required to obtain a color balance of a photographic print from a color negative. An additional photometric means relates to exposure-time measurements by a digital exposure meter wherein the exposure time displayed by digital means is inversely proportional to the light intensity of a projected negative. A drawback in the prior art has been that most devices for this purpose utilize ammeters and the like, which are subject to drift and mechanical offset introducing uncertainty in the readings as well as consuming an operator's time locating the position of a deflected needle relative to a dimly illuminated scale. Furthermore, to provide reasonably accurate measurements and sensitivity, a high-cost delicate meter must be used. Selectable reciprocity effect compensation for a photographic paper cannot be utilized in a meter instrument, and no means are provided in prior art to determine exposure time by density measurements of a negative regardless of the light level.

We have circumvented these drawbacks by developing an economical instrument capable of accurately and rapidly measuring and digitally displaying optical densities of color compensating filters for photographic color printing and exposure times by density measurements, utilizing among other things, memory gain means to vary the signal gain, a signal integrator coupled to the memory gain means and to a voltage comparator, a reset voltage pulse generator controlling a plurality of gates, an exponential decaying voltage source coupled to the voltage comparator, a voltage pulse generator generating a reference voltage pulse of predetermined duration, a gatable clock controlled by the voltage comparator and reference voltage pulse, decimal counter, latch and a digital read-out to display optical density or optical density differences, a binary counter controlling the slope of a second integrator voltage, a second voltage comparator coupled to the second integrator and to a fixed or variable voltage source, a gate coupled to the second voltage comparator controlling the integration interval of the signal integrator and gating a second gatable clock, a decimal counter, latch and digital readout to display exposure time.

SUMMARY OF THE INVENTION

A reference area of a color negative illuminated by light from a light source transmitted through a color compensating filter pack is imaged on the aperture of a probe. A light guide directs the light from the probe through selectable primary color filters or a neutral density filter, onto the photosensitive surface of a photodetector producing detector currents proportional to the light intensity incident on the probe. The voltage developed across a resistor by the detector current is amplified by a first variable gain linear amplifier. Memory gains are provided by a second linear amplifier, the gain of which is fixed for selection of the red primary color filter and independently controlled by the variable feedback resistive means associated with the selection of the remaining primary color filters and neutral density filter, and wherein the memory gains are preset by measurements of a standard color negative. The output terminal of the second linear amplifier is coupled through an input gate-controlled switch and selected variable or fixed resistive means to the input terminal of an integrator, the capacitor of which is shunted by a gate-controlled switch. Said switches are controlled by further gating means coupled to a second integrator or to a voltage pulse generator, wherein the input switch is closed and the switch shunting said capacitor is opened coincident with the occurence of a periodically generated reset voltage pulse, and the input switch is opened by gating means coupled to the second integrator or to a voltage pulse generator. A ganged switching means, mechanically coupled to selection means of primary color and neutral density filters, couples the signal integrator to said variable resistive means for primary color filter selection associated with color density measurements and to said fixed resistive means for selection of the neutral density filter associated with exposure time related density measurements. The output voltage of the signal integrator is held when said input switch is opened, wherein said output voltage is proportional to the time of integration, intensity of light incident on the photodetector, the memory gain and resistance of said selected resistive means. A capacitor, which is gated to charge abruptly coincident with the occurence of the reset voltage pulse, is gated to discharge exponentially through a resistive means when the input switch to the signal integrator opens. Said capacitor is coupled to one input terminal and the output terminal of the signal integrator is coupled to the other input terminal of a voltage comparator, the output terminal of which is coupled to one of the input terminals of NAND and NOR gates. A pulse generator, which generates a reference voltage pulse of predetermined and fixed duration and is gated on by the reset voltage pulse, is coupled to the other input terminals of said NAND and NOR gates, the output terminals of which are coupled to the set and reset input terminals of a set-reset flip-flop, respectively. The enabling terminal of a gate-controlled clock is coupled to the set output terminal of said set-reset flip-flop, wherein said clock is enabled for the set state of said flip-flop. Said clock is therefore enabled when either the output voltage of the voltage comparator or reference voltage pulse change from high to low, and said clock is inhibited when both of said voltages are low. The output terminal of the voltage comparator is further coupled to one input terminal of an AND gate and said pulse generator is coupled to the other input terminal through an inverter. The reset input terminal of a second set-reset flip-flop is coupled to the output terminal of said AND gate. Said second flip-flop is reset only if the voltage reference voltage pulse changes from high to low and before the output voltage of said voltage comparator. A decimal counter which is reset by said reset voltage pulse is coupled to the clock wherein the count of said decimal counter is latched and transferred to a density LED digital readout. Set and reset output terminals of the second flip-flop are coupled to a latch, said latch transferring a positive sign for the set state and a negative sign for the reset state of said second flip-flop to a sign LED readout. The sign displayed by the sign LED readout and the count displayed by the density LED digital readout indicate the density of a selected primary color compensating filter to add or subtract from a filter pack to obtain a color balanced print from a measured negative; the density indicated by the density LED digital readout related to exposure time is the density representative of a particular print reflectivity, wherein the density read out is dependent on the integration time of the signal integrator. Gating means coupled to a second integrator and voltage comparator controls said integration time such that said integration time is inversely proportion to the light intensity of an imaged reference area of a negative producing said particular print reflectivity; density-measurement and exposure-time display selection is provided by a two position-exposure selectror switch. In the exposure-time display position of the exposure selector switch, the density measuring circuitry is inhibited. A voltage source is coupled to a gated resistive means, wherein gate-controlled switches are coupled to a binary counter. Said resistive means is coupled to the input terminal of the second integrator, the capacitor of which is shunted by a gate-controlled switch. The output terminal of the second integrator is coupled to one input and a variable exposure voltage source coupled to the other input of the second voltage comparator, the output terminal of which is coupled to the reset input terminal of a third set-reset flip-flop, which is reset by the reset voltage pulse. The set output terminal of the third set-reset flip-flop is coupled to the enabling terminal of the second clock, the switch shunting the capacitor of the second integrator and to the input switch of the signal integrator. The set state of the third flip-flop enables the second clock, closes the input switch to the signal integrator and opens the switch shunting the capacitor of the second integrator; the reset state of the third flip-flop inhibits said clock, opens the switch to the signal integrator and closes the switch shunting the capacitor of the second integrator. A decimial counter is coupled to said clock and is reset by the reset voltage pulse. The clock count of the decimal counter is lateched and transferred to an exposure LED digital readout, wherein the count displayed indicates exposure time including compensation for the reciprocity effect of the photographic paper. The reciprocity compensation is provided for by the decreasing slope of the second integrator output voltage resulting from said gated resistive means. For the density-measurement position of the exposure selector switch, the density measuring circuitry is enabled and the second integrator capacitor is charged through a fixed resistive means. The reset state of said third flip-flop opens the input switch to the signal integrator. Thus, the integration time of the signal integrator is a linear function of the variable exposure voltage whereas the exposure time displayed is a function of the variable exposure voltage that provides compensation for the reciprocity effect. The density displayed by digital means and representative of a print reflectivity which will result for the projected area of the negative and for the exposure time displayed by digital means, is determined by the variable exposure voltage, the exposure memory gain having been preset by measurement of a standard negative.

The second decimal counter may comprise an up-down counter wherein the count is held by the latch associated with said decimal counter may be utilized for automatically timing a photographic printing system when enabled to down-count. Alternatively the count held in the latch may be strobed into an external digital timer which could be used for automatic exposure timing.

A switch is provided to either couple the second linear amplifier input terminal to the output terminal of the first amplifier or to a fixed voltage source. When the input terminal of the second amplifier is coupled to the fixed voltage source, the memory gains of the second amplifier are displayed by the density LED digital readout, providing means for accurately resetting the memory gains.

A potentiometer means coupled to a voltage source and to one of the input terminals of the first amplifier provides means for balancing the off-set voltage of the first amplifier and the dark current of the photodetector to zero.

An alternative digital-analog circuit may be used for making exposure time measurements including the reciprocity effect compensation for the photographic paper by density measurements of a projected image, wherein the density measured is representative of a particular print reflectivity: a dial, calibrated to display exposure time including reciprocity effect compensation for the photographic paper, is coupled to a feedback potentiometer which controls the gain of a linear amplifier coupled between the first and second amplifiers and said switches coupled to the input terminal of the signal integrator and shunting the capacitor of the signal integrator are controlled by a voltage pulse of predetermined and fixed duration produced by a voltage pulse generator. The density displayed by digital means for the projected image is representative of the print reflectivity which will result for the exposure time displayed on the dial, the exposure memory gain having been preset by measurement of a standard negative. The modified circuit also provides the capability for measuring and displaying by digital means the densities of color compensating filters required for a color balance of a color negative.

A combination of components of the analog to digital circuit for measuring filter densities and exposure time by density measurements may be utilized to function as an exposure meter. The exposure time measured and displeyed by digital means is the the exposure time as conventionally measured which is inversely proportional to the light intensity of a projected image, wherein: phtocurrent produced by light from a reference area of a negative imaged on the probe is amplified by a linear amplifier, the output terminal of which is coupled to the input terminal of the signal integrator through a variable resistive means. Said variable resistive means controls the gain of said signal integrator, the output terminal of which is coupled to one input terminal of a voltage comparator and a fixed voltage source is coupled to the other input of the voltage comparator, the output terminal of which is coupled to the reset input terminal of a first set-reset flip-flop which is reset when the voltage at the output terminal of the voltage comparator changes from low to high. A gate-controlled switching shunting the signal integrator capacitor is coupled to the set output terminal of said flip-flop and is opend when said flip-flop is set and closed when said flip-flop is reset. A gate-controlled clock is coupled to the set output terminal of a second set-reset flip and is enabled when said flip-flop is set and inhibited when said flip-flop is reset. The reset pulse generator sets said flip-flops and resets a decimal counter coupled to said clock; said capacitor coupled to the integrator is linarly charged by the voltage at the output of said amplifier and said clock is enabled. When the integrator output voltage is equal to said fixed voltage, the voltage at the output of the voltage comparator changes from low to high, resetting the second flip-flop, which inhibits the clock and resets the first flip-flop, which closes the switch shunting the integrator capacitor. The clock count of the decimal counter is latched and transferred to an LED digital readout, said count displayed corresponding to exposure time wherein the resistance of said variable resistive means is preset by measurement of a standard negative.

OBJECTS OF THE INVENTION

It is therefore an object of the invention to detect by integrating means and to indicate by digital means the optical density differences for primary color components of light between a standard color negative and a color negative to be printed.

A further object of the present invention is to measure optical density differences for the primary color components of light between a standard color negative and a negative to be printed without regard to the absolute densitites.

Another object of the invention is to store reference gains proportional to the primary colors transmitted through a standard filter pack and reference area of a standard color negative, one of which is a predetermined fixed gain.

An additional object of the invention is to prove digital means to measure and analog means to displey exposure times incouding reciprocity effect compensation for the photographic paper.

A further object of the invention is to store a reference gain proportional to light transmitted through a selected area of a standard negative by adjusting the exposure memory gain to reproduce a density display representative of a particular print reflectivity for the exposure time digitally displayed or displayed by analog means.

Another object of the invention is to display by digital means the density representative of a particular print reflectivity for any reference area of a photographic negative to be printed and to display the exposure time required to produce the particular print reflectivity either by digital or analog means.

A further object of the invention is to provide reciprocity effect compensation plug-in modules so that changes in the reciprocity effect compensation for different photographic papers can easily be made.

Another object of the invention is to provide down-count capability of a decimal counter for automatically timing a photographic printing system or interfacing with an existing digital timer.

A further object of the invention is to utilize an integrated circuit means to provide voltage regulation for a switching tansformer to develop the high voltage for a photodetector.

An additional object of the invention is to provied a digital exposure meter means, wherein the exposure time measured and displayed by digital means is inversely proportional to the light intensity of a projected negative.

DETAILED DESCRIPTION

Figures 1A, 1B:
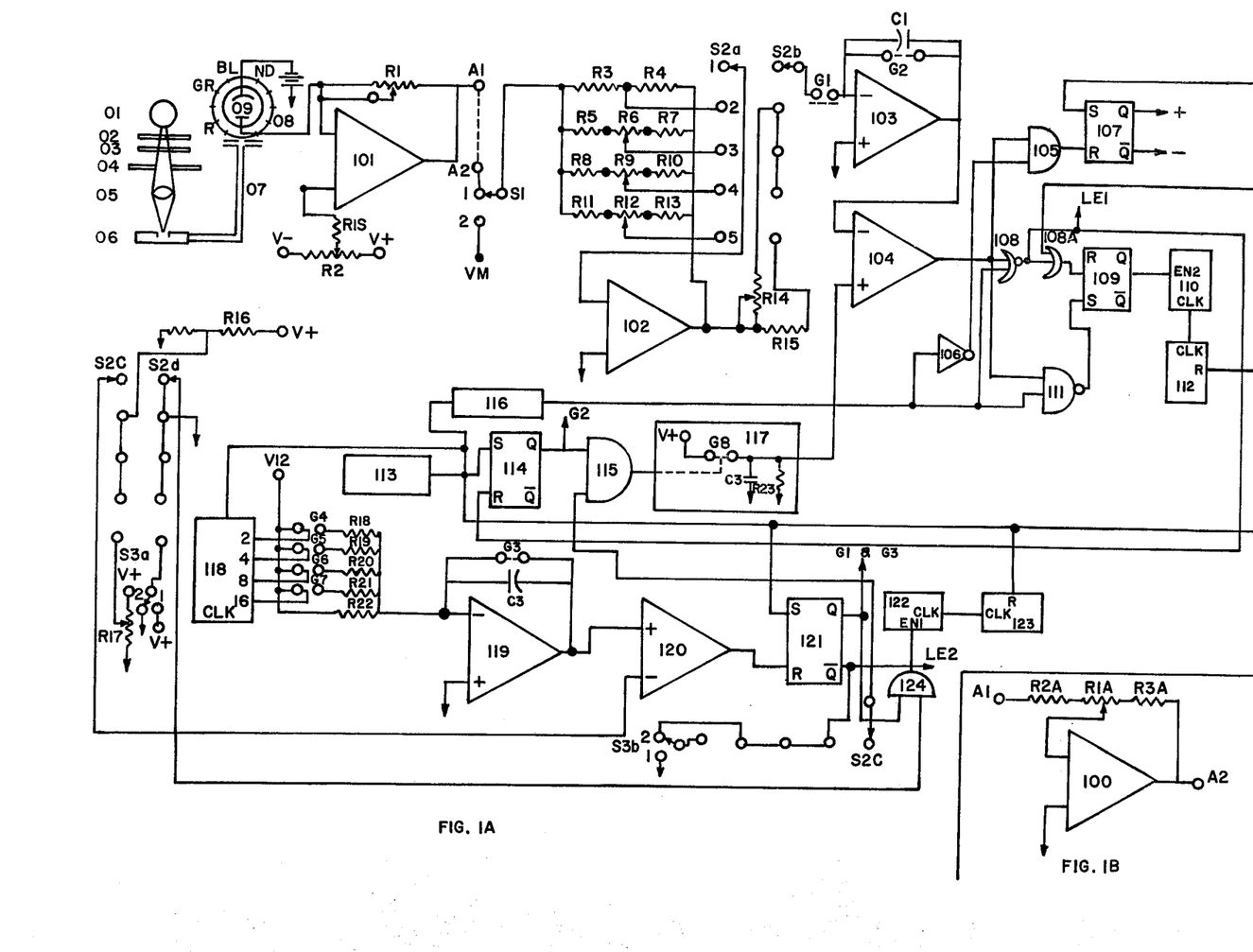
FIG. 1A is a schematic diagram of the circuit to measure and display by digital means the color filter compensation density corrections and the exposure time for photographic color printing, wherein the exposure time is determined by density and density-range measurements of a projected photographic negative. The exposure time displayed includes compensation for the reciprocity effect of the photographic paper.
FIG. 1B is a circuit diagram of a linear amplifier coupled to a dial calibrated to display exposure time by density and density-range measurements of a projected photographic negative or positive image. The dial displaying exposure time is calibrated to compensate for the reciprocity effect of the photographic paper.

Referring to FIG. 1A, there is shown a white light source 01 which is used to image a photographic color negative. A plurality of optical elements including: a filter pack 02; a negative holder 03; an adjustable aperture 04; an objective lens 05; a light probe 06; a light guide 07 and cylindrical filter wheel 08 are serially disposed in the path of light between the light source 01 and photodetector 09 mounted within said filter wheel. Cylindrical filter wheel 08 is provided with a plurality of filter windows, which in the preferred embodiment include a red filter R, a green filter GR, a blue filter BL and a neutral density filter ND. These filters may be selectively adjusted in alignment with the light guide 07. For reasons which will become apparent, the adjustment means of the cylinder is mechanically coupled and indexed by a ganged selector switch S2 which selectively aligns filters R, GR, BL and ND.

Light probe 06 and light guide 07 provide a convenient means for monotoring light imaged by a photographic printing system on the aperture of said light probe. Light probe 06 may utilize a suitable light pipe or simply a planar mirror to direct the imaged light into light guide 07.

Switch S2, mechanically coupled to said filter wheel, is a five-pole, five-position switch indexed to select an off position in position 1 and said R, GR and BL filters in positions 2, 3, and 4, and said ND filter in position 5. Imaged light transmitted through a selected filter is collected and directed to the photosensitive surface of the photodetector, which produces a photocurrent through resistor R1. The voltage generated by said photocurrent through resistor R1 is amplified by linear amplifiers 101 and 102. Switch section S2a of switch S2 is coupled to amplifier 102 and associated feedback resistors. In position 2 of switch S2, corresponding to selection of the red primary color filter, the gain of amplifier 102 is constant and determined by the ratio R4/R3. In positions 3, 4 and 5 of Switch S2, the gain of amplifier 102 is adjustable by means of feedback potentiometers R6, R11, and R12, respectively, which in turn are coupled to resistors R5 and R7, R8 and R10 and R11 and R13. The output terminal of amplifier 102 is coupled to variable resistor R14 for positions 2, 3, and 4 of switch S2 and to a fixed resistor R15 for position 5 of switch S2 by coupling means to switch section S2b.

Figure 2:
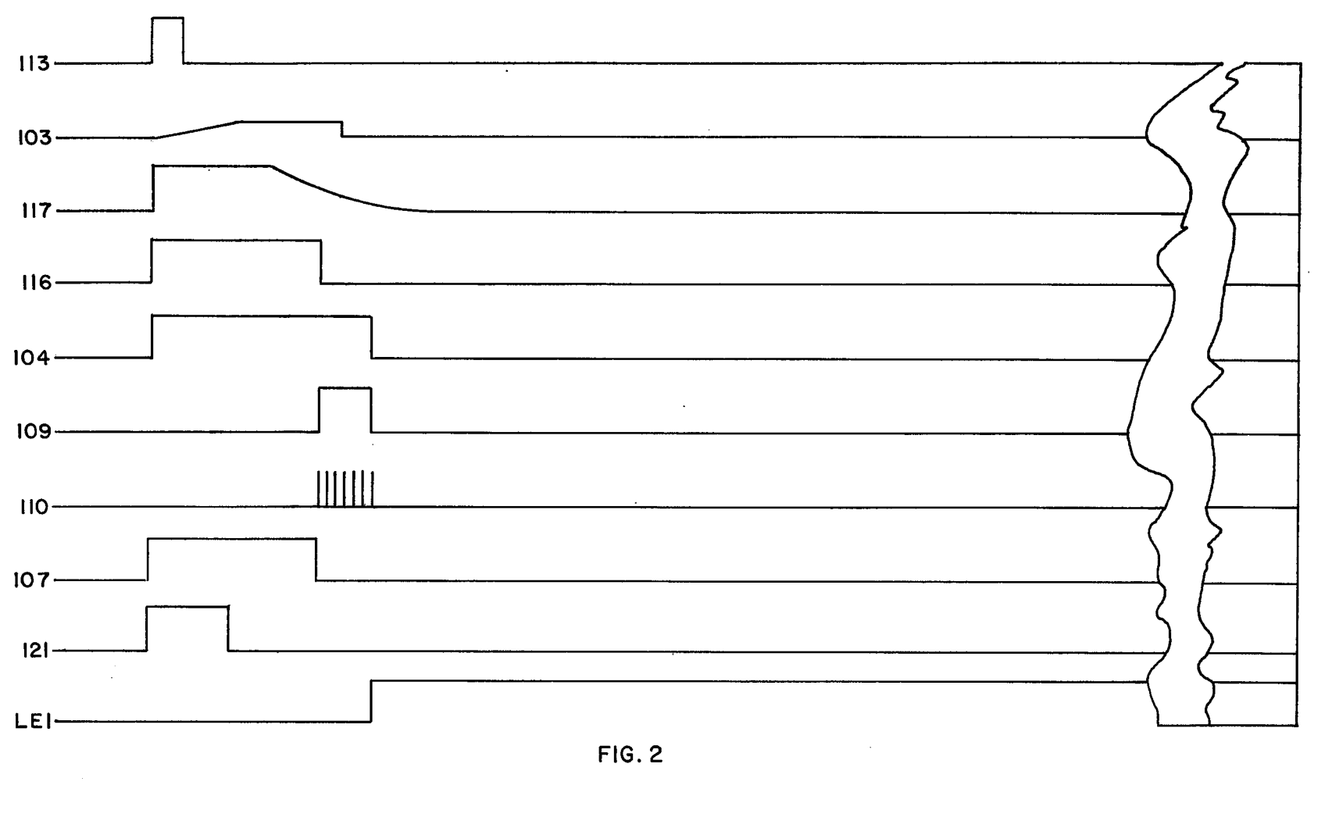
FIG. 2 is a timing diagram of one period showing signals utilized for digitally displaying the color compensating filter density corrections for printing a photographic color negative.

Referring to FIG. 2 there is shown a timing diagram for one period of a reset voltage pulse generated periodically by reset pulse generator 113 and for switch S2 in positions 2, 3 or 4 and switch S1 in position 1. The circuit description directly following corresponds to switches S2 and S1 in these positions. Gate-controlled switches G1–G8 shown in FIG. 1A are FET switches shown in positions corresponding to logical "0" bias. The pole of switch section S2b of switch S2 is coupled to signal integrator 103 through switch G1. Set input terminals of set-reset flip-flops 114 and 126 are coupled to said reset pulse generator and are set by the reset voltage pulse. The set output terminal of flip-flop 114 is coupled to switch G2, wherein switch G2 is opened by the set output voltage of flip-flop 114. The set output terminal of flip-flop 121 is coupled to switches G1 and G3, wherein the set output voltage of flip-flop closes switch G1 and opens switch G3. Capacitor C1, which is coupled to signal integrator 103, is therefore charged linearly by the signal voltage as the output of amplifier 102 coupled to C1 through resistor R14. The reset voltage pulse, which is coupled to the reset input terminals of binary counter 118 and decimal counter 123, reset said counters. Enabling terminal EN1 of the gate-controlled clock 122 is coupled to the output terminal of AND gate 124; the set output terminal of flip-flop 121 and the pole of switch section S2d of switch S2 are coupled to the input terminals of said AND gate. The output voltage of said AND gate is held low since one input of the AND gate is coupled to ground through switch section S2d. Therefore, clock 122 is inhibited. Switches G4–G7, in series with resistors R18–R21 are coupled to the binary output terminals of binary counter 118 and are opened sequentially by the voltages at the binary output terminals by the count of binary counter coupled to said clock. Switches G4–G7 remain closed since said clock is inhibited. Capacitor C3, coupled to integrator 119 and to resistors R18–R22 is therefore linearly charged by current produced by voltage source VR coupled to resistors R18–R21 in parallel combination. The output terminal of integrator 119 is coupled to one input terminal of voltage comparator 120 and the voltage divider R16 is coupled to the other input terminal of said voltage comparator; the output terminal of said voltage comparator is coupled to the input reset terminal of flip-flop 121. When the voltage at the output terminal of said voltage comparator changes from low to high, flip-flop 121 is reset, wherein the voltage change at the set output terminal of said flip-flop opens switch G1 and closes switch G3. The output voltage of signal integrator 103 is held since switches G1 and G2 are open. The input terminals of AND gate 115 are coupled to the set output terminal of flip-flop 114 and reset output terminal of flip-flop 121. The voltage at the output of said AND gate is held low when flip-flops 114 and 121 are set by the reset voltage pulse. Switch G8 is then closed and capacitor C3 of the exponential ramp generator 117 is charged by the voltage source V+ coupled to said capacitor. When flip-flop 121 is reset by said voltage comparator, the voltage at the output of said AND gate changes from low to high. Gate G8 therefore opens and capacitor C3 discharges exponentially through resistor R23. Capacitor C3 is further coupled to one input terminal of voltage comparator 104 and the output terminal of integrator 103 is coupled to the other input terminal of said voltage comparator. Pulse generator 116, which is coupled to reset pulse generator 113 and gated on by the reset voltage pulse, produces a reference voltage pulse of predetermined and fixed duration. The output terminal of pulse generator 116 and that of voltage comparator 104 are coupled to the input terminals of NAND gate 111, the output terminal of which is coupled to the set input terminal of set-reset flip-flop 109. Said reset voltage pulse which is coupled through OR gate 108A to the reset input terminal of flip-flop 109 and decimal counter 112 resets said flip-flop and decimal counter. Gate-controlled clock 110 is inhibited by the voltage coupled to the enable terminal EN2 of said clock at the set output terminal of flip-flop 109. At the instant when either the output voltage of pulse generator 116 changes from high to low or the voltage comparator 104 output voltage changes from high to low, the voltage at the output terminal of NAND gate 111 changes from low to high, setting flip-flop 109 which enables clock 110. Said decimal counter which is coupled to clock 110, counts clock pulses when said clock is enabled. Output terminals of voltage comparator 104 and pulse generator 106 are further coupled to the input terminals of NOR gate 108, the output terminal of which is coupled to reset terminals of flip-flop 109 through OR gate 108A and flip-flop 114. When the output voltages of voltage comparator 104 and pulse generator 116 are both low, the output voltage of NOR gate 108 changes from low to high, which resets said flip-flops and generates a latch enable voltage LE1. Clock 110 is inhibited by the voltage coupled to the enable terminal EN2 of the clock by the set output terminal of flip-flop 109 when said flip-flop is reset and the voltage at the set output terminal of flip-flop 114, which is coupled to one input terminal of AND gate 115 produces a voltage change from high to low at the output terminal of said AND gate which closes switches G2 and G8, charging capacitor C3 coupled to voltage source V+ and discharging capacitor C1. The count of clock pulses counted by decimal counter 112 is held by a latch enabled by the latch enable voltage LE1 and transferred to a density LED digital readout. Pulse generator 116 is further coupled to one input terminal of AND gate 115 through an inverter 106 and the other input terminal of AND gate 105 is coupled to voltage comparator 104. The output terminal of said AND gate is coupled to the reset input terminal of set-reset flip-flop 107, the set input terminal of which is coupled to reset generator 113 and is set by the reset voltage pulse. Only when the output reference voltage of pulse generator 116 changes from high to low before the output voltage of voltage comparator 103 is flip-flop 107 reset. The reset output terminal of flip-flop 107 is coupled to a latch which transfers a negative sign to an LED sign readout; the set output terminal of said flip-flop is coupled to a latch which transfers a positive sign to said LED sign readout. To provide density read out in CP (color compensating) filter units, the duration of the reference voltage pulse is selected to be equal to $100 \cdot \text{Log}_{10}(V+/V2)$ in units of the period of clock 110 and the time constant of the exponential discharge of capacitor C3 through resistor R23 is selected to be equal to 230 in units of the period of clock 110; the voltage V2 determines the measureable density range.

To calibrate the instrument for density measurements, a standard negative and filter pack which produce a color balanced print are selected. Light transmitted through a selected reference area of the standard negative is imaged on the probe and directed to the photodetector through the selected primary color filters. For position 2 of switch S2 corresponding to selection of the red primary color filter, the signal integrator gain control R14 and/or adjustable aperture adjusted until the output voltage of voltage comparator 104 changes from high to low at the same time that the the out voltage of pulse generator 116 changes from high to low, wherein clock 110 is not enabled and the count displayed by the LED digital readout is zero. For positions 3 and 4 of switch S2, corresponding to green and blue primary color filter selection, respectively, potentionmeters R6 and R11 are adjusted in turn so the count displayed by the density LED digital readout is zero.

To determine the densities of color compensating filters for a color negative to be printed, the light through a selected filter pack and reference area of the negative to be printed similar in color content to the reference area of the standard negative, is imaged on the aperture of the probe. For switch S2 in position 2, corresponding to selection of the red primary color filter, the signal integrator gain control R14 and/or adjustable aperture adjusted until the count displayed by the density LED digital readout is zero. Then, for position 3 of switch S2, the sign displayed by the LED sign readout and the count displayed by the density LED digital readout indicate the green absorbing compensating filter density to add or subtract from the selected filter pact to obtain a color balanced print; for position 4 of switch S2, the sign displayed by the LED sign readout and the count displayed by the density LED digital readout indicates the blue absorbing compensating filter density to add or subtract from the selected filter pack to obtain a color balanced print of the negative.

Figure 3A:
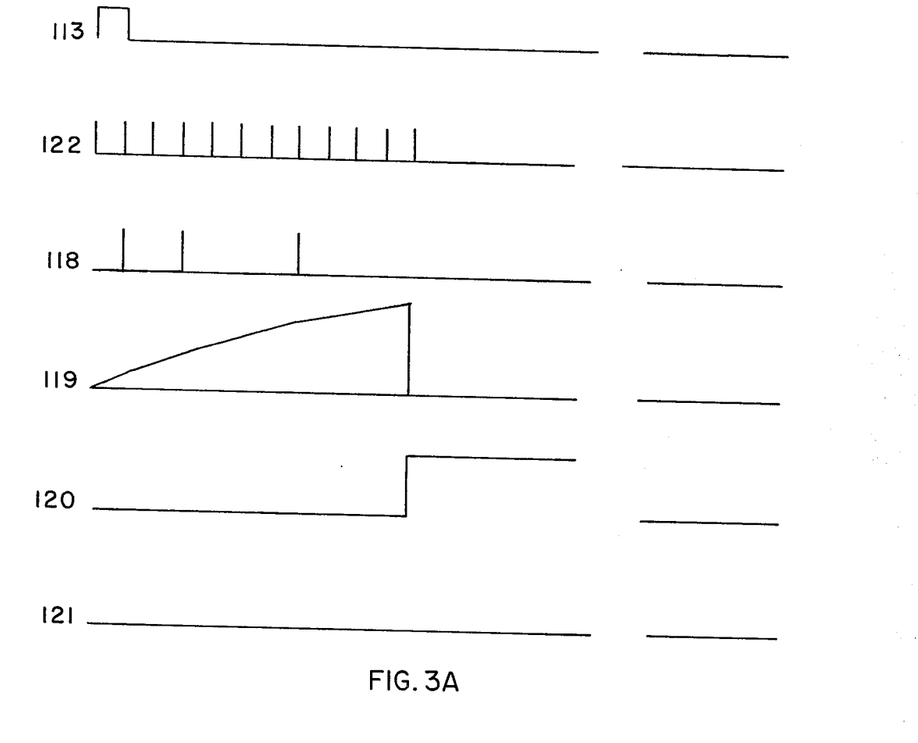
FIG. 3A is a timing diagram of one period showing signals utilized to display exposure time digitally including compensation for the reciprocity effect of the photographic paper.

Referring to FIG. 3A, there is shown a timing diagram for signals utilized to display exposure time digitally including compensation for the reciprocity effect of the photographic paper, wherein selector switch S2 is set in position 5 and selector switch S3 in position 1. One input of AND gate 115 is coupled to ground through switch section S3b of switch S3, inhibiting the density measuring circuitry. Reset terminals of binary counter 118 and decimal counter 123 and the set input terminal of set-reset flip-flop 121 are coupled to the reset pulse generator 113; said counters are reset and said flip-flop is set by the reset voltage pulse. Input terminals of AND gate 124 are coupled to the set output terminal of flip-flop 121 and to voltage source V+ through switch section S3b of switch S3. The voltage output of said AND gate is therefore set high providing a clock enabling input to terminal EN1 of gate-controlled clock 122. Clock input terminals of binary counter 118 and decimal counter 123 are coupled to the clock output terminal of said clock. Binary counter counts clock pulses of said clock, opening switches G4, G5, G6 and G7 at clock counts 2, 4, 8 and 16, respectively. Switch G3, which is coupled to the set output terminal of flip-flop 121, is opened by the set output voltage of said flip-flop. Capacitor C2, coupled to integrator 119, is therefore charged by voltage source VR through a decreasing number of resistors in parallel corresponding to clock counts 2, 4, 8 and 16. These resistors are selected so that the slope of the output voltage of integrator 119 decreases with time in such a way as to compensate for the reciprocity effect of the photographic paper. One input terminal of the voltage comparator 120 is coupled to the exposure control potentiometer R17 through switch section S2c and the other input terminal of said voltage comparator is coupled to the output terminal of integrator 119. When the output voltage of said integrator is equal to the voltage controlled by potentiometer R17, the output voltage of said voltage comparator changes from low to high, resetting flip-flop 121. The reset state of flip-flop 121 closes switch G3 and inhibits clock 122 by the set output voltage of said flip-flop coupled to the input terminal of AND gate 124. The count of clock pulses by decimal counter 123 is transferred to an exposure LED digital readout by a latch, enabled by the reset output voltage LE2 of set-reset flip-flop 121. The count displayed by the exposure LED digital readout is equal to the exposure time including compensation for the reciprocity effect of the photographic paper.

Figure 3B:
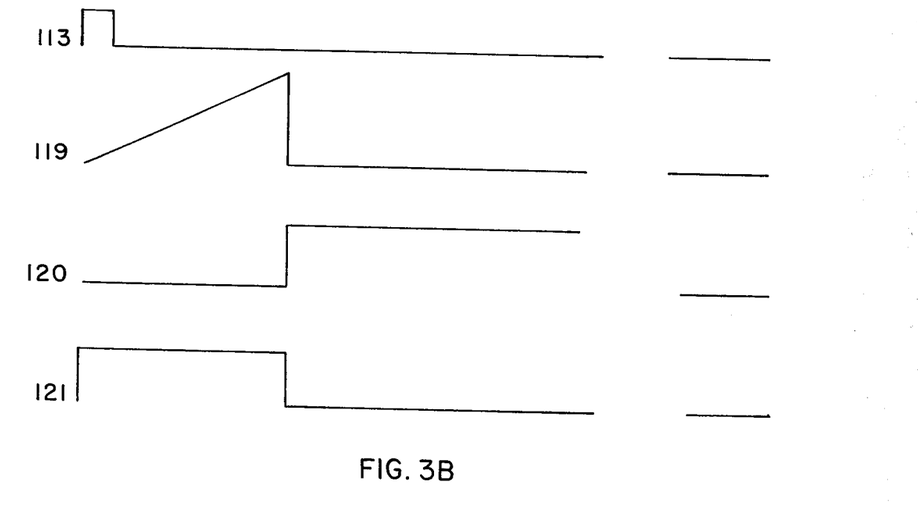
FIG. 3B is a timing diagram of one period showing signals utilized for density measurements representative of print reflectivies that will be produced for a reference area of a projected image of a negative and exposure time that is displayed digitally.

Referring to FIG. 3B, there is shown a timing diagram of signals utilized in the density measuring circuitry to measure and display by digital means the density of a reference area of a projected image of a negative, wherein said density corresponds to a particular print reflectivity for the exposure timed displayed by the exposure LED digital readout, wherein switch S3 is set in position 2. The density measuring circuitry is enabled by by the coupling of one input of AND gate 115 to the reset output terminal of flip-flop 121 through switch section S2e; clock 122 is inhibited by the input of AND gate 124 coupled to ground through switch section S2d and switch section S3a. Since clock 122 is inhibited, binary counter 118, reset by the reset voltage pulse remains reset, holding switches G4–G7 closed. Switch G3, shunting capacitor C2, is opened by the set output voltage of flip-flop 121 coincident with the occurence of the reset voltage pulse. Capacitor C2 is therefore linearly charged by voltaged source VR coupled to resistors R18-R12 connected in parallel. The timing diagram for the density measurement is essentially that shown in FIG. 2 except that the time interval of integration of signal integrator 103 is equal to the time between the occurence of the reset voltage pulse and the time that the output voltage of integrator 119 is equal to the voltage produced by the exposure potentiometer R17 coupled to voltage comparator 120. The density displayed by the density LED digital readout is representative of the print reflectivity for the exposure time displayed by the exposure LED digital readout, the exposure memory gain having been preset by measurement of a standard negative.

To calibrate the instrument for exposure time measurements, the exposure time is determined for a standard negative having a density range required to produce a print with a desired range of reflectivity. Exposure switch S3 is switched to position 1 and the exposure control voltage produced by potentiometer R16 is adjusted so that the exposure time displayed by the exposure LED digital readout is equal to the exposure time determined for the standard negative. Switch S3 is then switched to position 2. Light from a reference area of the standard negative producing near zero print reflectivity is imaged on the aperture of the probe. The gain or amplifier 102 is adjusted by potentiometer R12 until the density displayed by the density LED digital readout is zero.

To determine the exposure time for a negative to be printed, switch S3 is switched to position 2 and a reference area of the negative is imaged on the probe. The exposure control potentiometer R17 is adjusted so that the density displayed by the density LED digital readout is representative of a desired print reflectivity. Switch S3 is then switched to position 1. The exposure time displayed by the exposure LED digital readout is the exposure time including compensation for the reciprocity effect of the photographic paper required to produce said desired print reflectivity. The count of decimal counter 123, latched and displayed may be strobed into an external digital timer or alternatively the decimal counter 123 may comprise an up-down counter coupled to a suitable clock when the up-down counter is enabled to down count, thus providing automatic digital timing for a photographic printing system.

Resistors R18–R21 may be mounted in a plug-in module to provide means for changing the slope of the output voltage of integrator 119 to conform with that required to compensate for the reciprocity effect of various photographic papers.

R1S and potentiometer R2 coupled to positive and negative voltage sources V+ and V− provide means to compensate for the offset voltage of amplifier 101 and dark current of photodetector 09. Potentiometer R1 and amplifier 101 provides means for adjusting the gain of said amplifier to compensate for sensitivity variations between photodetectors.

Memory gains can be displayed digitally by coupling the input terminal of amplifier 102 to voltage source V+ by switch S1, thereby providing means for accurately resetting memory gains.

The photodetector 09 may comprise a photomultiplier tube, wherein an economical and convenient means for generating a regulated high voltage is to utilize a push-pull switching transformer coupled to transistor means and to integrated circuit voltage regulator means.

An alternative circuit can be derived from the circuit shown in FIG. 1A, wherein the exposure time including compensation for the reciprocity effect of a photographic paper, is displayed by analog means: terminals A1' and B1' of linear amplifier 100 shown in FIG. 1B are coupled to terminals A1 and B1 in the circuit shown in FIG. 1A. Feedback potentiometer R1A controls the gain of amplifier 100; calibration means are provided, wherein a dial coupled to said potentiometer is calibrated to read exposure time including compensation for the reciprocity effect of a photographic paper. A pulse generator, coupled to the reset generator 113 and its output terminal coupled to the set input terminal of set-reset flip-flop 121 replaces the voltage comparator 120 and associated circuitry coupled to said voltage comparator. All other circuit connections for exposure measurements correspond to switch S2 in position 5 and switch S3 in position 2. The pulse generator is gated on by the reset voltage pulse and produces a voltage pulse of predetermined and fixed duration. The exposure time read on the calibrated dial includes the reciprocity compensation and the density measured for a reference area of a negative projected on the probe and displayed by the density LED digital readout is representative of a particular print reflectivity for said exposure time.

Figure 4:
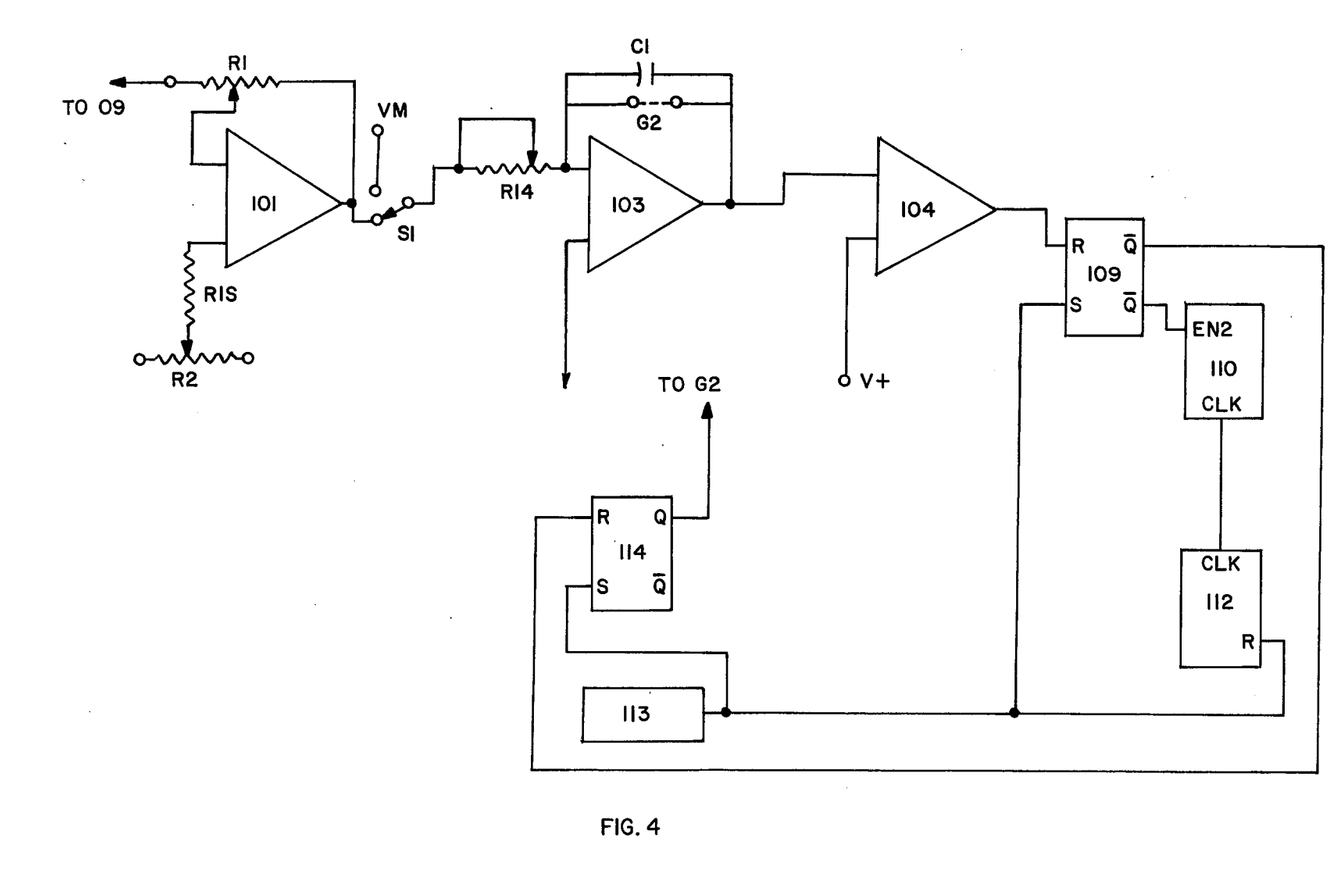
FIG. 4 is a schematic diagram of the digital exposure meter.

A combination of circuit components of FIG. 1A shown in FIG. 4 comprise a digital exposure meter means, wherein the exposure time measured is inversely proportional to the light intensity of a reference area of a negative imaged on the probe. Photodetector current produced by said light imaged on the probe produces a voltage at the output of amplifier 101 which is inversely proportional to the intensity of said imaged light. Position 1 of selector switch S1 is coupled to the output terminal of amplifier 101 and position 2 is coupled to a voltage source VR and the pole of said switch is coupled through a variable resistor R14 to the input of integrator 103 providing memory means. The input terminals of voltage comparator 104 are coupled to the output terminal of said integrator and to a fixed voltage source V+ and the output terminal of said voltage comparator is coupled to the reset input terminal of set-reset flip-flop 109. Reset pulse generator 113 is coupled to the set input terminals of set reset flip-flops 109 and 114 and to the reset terminal of decimal counter 112, setting said flip-flops and resetting said decimal counter. Coincident with the occurence of the reset voltage pulse, gate-controlled switch G2 is opened by the set output voltage of flip-flop 114 coupled to said switch and gate-controlled clock 110 is enabled by the set output voltage of flip-flop 109 coupled to the enable terminal EN2 of said clock. Capacitor C1 is therefore charged linearly by the voltage output of amplifier 101 coupled to the input terminal of said integrator through variable resistor R14. At the instant when the integrator output voltage is equal to the fixed voltage applied to said voltage comparator, flip-flop 109 is reset; the voltage change at the reset output terminal of flip-flop 109 from low to high resets flip-flop 114 closing switch G2 which discharges capacitor C1; the change in voltage at the set output terminal of flip-flop 109 from high to low inhibits said clock. Decimal counter 112, coupled to said clock, counts the clock pulses. A latch, coupled to said decimal counter, is enabled by the latch enable voltage LE2, transferring the count of said decimal counter to an exposure LED digital readout.

To calibrate the meter, a standard negative is selected and the exposure time determined to provide a print with a normal exposure. A selected reference area of the standard negative is imaged on the probe and the gain of said integrator 103 is adjusted by means of the variable resistor R14 so that the count displayed by the exposure LED digital readout is equal to the exposure time determined for the standard negative.

To determine the exposure time for a selected negative, a reference area of the negative having a density similar to that of the standard negative is imaged on the probe. The count displayed by the exposure LED digital readout corresponds to the proper exposure time inversely proportional to the light intensity of said negative image.

Integrator 103 is coupled to the fixed voltage source VM through memory gain control resistor R14 by switch S1. The count displayed by the exposure LED digital readout when said integrator is coupled to the voltage source VR is proportional to the integrator gain and thus provides means for accurately resetting the memory gain.

What is claimed and desired to be secured by Letters Patent:

1. A photometric device for determining by analog to digital means the optical densities of color compensating filters required to obtain a color balance of a color negative to be printed and the exposure time, including compensation for the reciprocity effect of a particular photographic paper by an associated density measurement of said color negative, said density representative of a particular print reflectivity comprising:
- a light source for generating light of a paticular intensity;
- means for supporting a color compensating filter pack;
- means for supporting a color negative, illuminated by light from said light source transmitted through said color compensating filter pack;
- optical means for providing an image of a selected area of said illuminated negative on the aperture of a probe;
- adjustable aperture means controlling the intensity of said image;
- optical coupling means to direct said light from said image through selectable primary color filters or a neutral density filter;
- photodetector means collecting light from said image directed through said selected filters providing a current proportional to the intensity of the selected spectral component of said collected light;
- a first linear amplifier means coupled to said detector means producing a voltage proportional to said detector current;
- variable feedback resistive means coupled to said first amplifier means, wherein the gain of said first amplifier means is adjustable by said variable feedback means;
- selector switch means wherein the output terminal of said first amplifier means is coupled to position 1 of a first selector switch and wherein said first selector switch is coupled to a voltage source in position 2;
- memory standard means comprising a second linear amplifier means coupled to the pole of said first selector switch and wherein said second amplifier means is coupled to selective feedback resistive means which control the gain of said second amplifier means;
- a first ganged selector switch means mechanically coupled to said selected primary color and neutral density filters and wherein the red said primary color filter is selected in position 2 and the remaining primary color filters are selected in positions 3 and 4 and said neutral density filter is selected in position 5;
- a selector switch means comprising the first section of said first ganged switch means wherein the pole of said first section is coupled to said second linear amplifier means and to said feedback resistive means of said second amplifier means and wherein position 2 of said first switch section is coupled to a fixed said feedback resistive means and coupled to independently variable said feedback resistive means in in positions 3, 4, and 5 of said first switch section;
- a selector switch means comprising the second section of said first ganged switch means wherein positions 2, 3, and 4 of said second switch section are coupled to one terminal of a variable resistive means and position 5 is coupled to one terminal of a fixed resistive means;
- coupling means wherein the output terminal of said second amplifier means is coupled to the remaining terminals of said fixed and variable resistive means;
- a gate-controlled switch means coupled to the pole of said second section of said first ganged switch means;
- a signal integrator means wherein the input terminal of said signal integrator is coupled to said gate-controlled switch means;
- a second gate-controlled switch means shunting the capacitor coupled to said signal integrator;
- selector switch means comprising the third switch section of said first ganged switch means, wherein the pole of said third switch section is coupled to a fixed voltage source in positions 2, 3, and 4 and to a variable exposure voltage source in position 5 of said third switch section;
- switching means comprising the fourth section of said first ganged switch means wherein the pole of said fourth switch section is coupled to ground in positions 2, 3 and 4 and to the pole of a second ganged switch means in position 5 and wherein the pole of said first section of said second ganged switch means is coupled to a fixed voltage source in position 1 and to ground in position 2 of said first switch section of said second ganged switch means;
- a gate-controlled clock means provided with an enable input terminal;
- an AND gate means wherein the output terminal of said AND gate is coupled to the enable terminal of said clock;
- a first enabling means wherein the pole of said fourth section of said first ganged switch means is coupled to one input terminal of said AND gate;
- set-reset means comprising a reset pulse generator wherein said reset pulse generator produces a reset voltage pulse periodically;
- binary counter means wherein the reset means of said binary counter is coupled to said reset pulse generator and clock input means of said binary counter is coupled to said clock;
- parallel resistive means each in series with a gate-controlled switch coupled to a fixed voltage source;
- binary gating means coupled to said binary counter wherein the binary terminals of said binary counter are coupled to said gate-controlled switches in series with each of said parallel resistive means, opening said switches sequentially when said binary counter is clocked;
- a second integrator means coupled to said parallel resistive means;
- capacitor means coupled to said second integrator means wherein said capacitor is shunted by a gate-controlled switch;
- a first voltage comparator means wherein one input terminal of said voltage comparator is coupled to the output terminal of said second integrator and the remaining input terminal of said voltage comparator is coupled to the pole of said third section of said first ganged switch means;
- a gating means comprising a first set-reset flip-flop wherein the input reset terminal of said flip-flop is coupled to the output terminal of said first voltage comparator and wherein the set input terminal of said flip-flop is coupled to said reset pulse generator;
- switching means comprising the second switch section of said second ganged switch means wherein position 1 of said second section is coupled to ground and position 2 is coupled to the reset output terminal of said first set-reset flip-flop;

switching means comprising the fifth switch section of said first ganged switch means wherein positions 2, 3 and 4 of said fifth switch section are coupled to the reset output terminal of said first set-reset flip-flop and position 5 of said fifth section is coupled to the pole of said second switch section of said second ganged switch means;

gating means comprising said first set-reset flip-flop wherein the set output terminal of said flip-flop is coupled to said switch coupled to the input terminal of said signal integrator, to said switch shunting said second integrator and to the remaining input terminal of said AND gate;

a decimal counter means wherein the clock input of said decimal counter is coupled to said clock and the reset terminal of said decimal counter is coupled to said reset pulse generator;

a latch means coupled to said decimal counter and enabled by the reset output voltage of said first set-reset flip-flop;

an exposure LED digital readout coupled to said latch means wherein the count of said decimal counter is transferred to said readout by said latch;

a gating means comprising a second set-reset flip-flop wherein the set input terminal of said second flip-flop is coupled to said reset pulse generator and the reset input terminal of said flip-flop is coupled to the output terminal of a NOR gate and wherein the set output terminal of said second flip-flop is coupled to said switch shunting said signal integrator capacitor and to one input of a second AND gate;

a second gate-controlled clock means provided with an enable input means;

a gating means wherein the remaining input terminal of said second AND gate is coupled to the pole of said fifth switch section of said first ganged switch and wherein the output terminal of said AND gate is coupled to a gate-controlled switch, which is coupled to a fixed voltage source and to a capacitor means shunted by a resistive means to ground;

a calibration means wherein the time constant for the discharge of said capacitor means through said resistive means is equal to 230 in units of said second clock period;

a voltage pulse generator means wherein said voltage pulse generator is gated on by said reset voltage pulse and generates a voltage pulse of duration equal to $100 \cdot \text{Log}_{10}(V_o/V_2)$, wherein $V_o$ is the voltage to which said capacitor means charges, $V_2$ determines the range of measurement and said duration is expressed in units of the period of said second clock;

a second voltage comparator means, wherein the input terminals of said voltage comparator are coupled to said capacitor means and to the output terminal of said signal integrator;

a gating means comprising a NAND gate, the input terminals of which are coupled to said voltage pulse generator and to the output terminal of said second voltage comparator;

an inverter means wherein the input terminal of said inverter is coupled to said pulse generator means;

a gating means comprising a third AND gate, the input terminals of which are coupled to the output terminals of said inverter and said second voltage comparator;

a gating means comprising said NOR gate, the input terminals of which are coupled to the output terminals of said voltage pulse generator and said second voltage comparator;

gating means comprising a third set-reset flip-flop wherein the reset input terminal of said third flip-flop is coupled to the output terminal of said NOR gate, the set input terminal is coupled to the output terminal of said NAND gate and the set output terminal of said third flip-flop is coupled to the enable input of said second clock;

a second decimal counter means coupled to said reset pulse generator and to the output terminal of said second clock;

a latch means coupled to said second decimal counter, wherein the enable input terminal of said latch means is coupled to the output terminal of said NOR gate;

a density LED digital readout means coupled to said latch means;

a gating means comprising a fourth set-reset flip-flop wherein the set input terminal of said fourth flip-flop is coupled to said reset pulse generator and the reset input terminal is coupled to the output terminal of said third AND gate;

a set-reset latch means coupled to the set and reset output terminals of said fourth flip-flop;

an LED sign readout means coupled to said set-reset latch wherein a positive or negative sign is transferred by said latch for the set and reset states of said fourth flip-flop, respectively;

indication means wherein the sign displayed by the LED sign readout and the count displayed by the density LED digital readout indicate the optical densities of color compensating filters to add or subtract from a filter pack to obtain a color balance of a negative to be printed for positions 2, 3 and 4 of said first ganged selector switch and the density LED digital readout indicates the optical density of a negative representative of a particular print reflectivity for position 5 of said first ganged selector switch and position 2 of said second ganged selector switch and wherein the count displayed by the first LED digital readout indicates the exposure time, including reciprocity compensation, for said first ganged selector switch in position 5 and said second ganged selector switch in position 1 resulting in said print reflectivity.

2. A photometric device for measuring exposure time by analog to digital means for a negative to be printed comprising;

a light source for generating light of a particular intensity;

means for supporting a negative illuminated by light from said light source;

optical means for providing an image of a selected area of said negative on the aperture of a probe;

photodetector means collecting said imaged light producing a current proportional to the intensity of said imaged light;

a first linear amplifier means coupled to said detector means producing a voltage proportional to said detector current;

variable feedback means coupled to said first amplifier means wherein the gain of said first amplifier means is adjustable by said variable feedback means;

a selector switch means wherein the output terminal of said first amplifier means is coupled to position 1 of said selector switch and a voltage source is coupled to position 2 of said selector switch;

a memory standard means comprising a variable resistive means coupled to the pole of said selector switch and to the input terminal of an integrator;

a switch means comprising a gate-controlled switch shunting the capacitor coupled to said integrator;

a pulse generator means for generating a set-reset voltage pulse periodically and coupled to the set input terminal of a first and second set-reset flip-flop and to the reset terminal of a decimal counter;

a voltage comparator means, the input terminals of which are coupled to the output terminal of said integrator and to a fixed voltage source, and the output terminal of said voltage comparator is coupled to the reset input terminal of said second set-reset flip-flop;

a gating means wherein the set output terminal of said first flip-flop is coupled to said gate-controlled switch, and wherein said switch is opened by the set state and closed by the reset state of said first flip-flop;

a gating means wherein the set output terminal of said second flip-flop is coupled to the enable terminal of a gate-controlled clock and the reset output terminal of said second flip-flop is coupled to the reset input terminal of said first flip-flop and to the enable terminal of a latch;

a counting means comprising said decimal counter means coupled to the output of said clock and to said latch means;

a digital display means comprising an LED digital readout coupled to said latch.

3. The device as claimed in claim 1 wherein an analog means for displaying exposure time by coupling a third linear amplifier means between said first said second amplifier means and further comprising:
  a. potentiometer feedback means coupled to said third amplifier means;
  b. calibration means coupled to said potentiometer means comprising a dial coupled to said feedback potentiometer and calibrated to display exposure time including compensation for the reciprocity effect of a photographic paper;
  c. density measurement means associated with said exposure time displayed by said dial, wherein circuit modification means are equivalent to: said first ganged selector switch in position 5, said second ganged selector switch in position 2 and wherein a pulse generator, gated on by said reset voltage pulse and generating a voltage pulse of predetermined duration, is coupled to the set input terminal of said first set-reset flip-flop and said binary counter, parallel resistive means, second integrator means, first voltage comparator, first gate-controlled clock, first decimal counter and latch, and first LED readout are disconnected from the circuit.

4. The device as claimed in claim 1 wherein said selected primary color filters are mounted on a cylinder mechanically coupled to said first ganged selector switch means.

5. The device as claimed in claim 1 wherein said phtodetector means comprises a photoultiplier tube or solid state photodiode.

6. The device as claimed in claim 1 wherein said linear amplifier means and integrator means comprise integrated circuit operational amplifiers.

7. The device as claimed in claim 1 wherein the gain of said first amplfier means can be adjusted so that the output voltage of said first amplifier remains constant for a given light level regardless of the sensitivity of said detector means and further potentiometer means wherein offset voltages of said first amplifier means and dark current of said detector means can be balanced to zero.

8. The device as claimed in claim 1 wherein said parallel resistive means are mounted in a plug-in module wherein said resistive means can be selected to provide compensation for the reciprocity effect of a selected photographic paper.

9. The device as claimed in claim 1 wherein said density measurement means can comprise an analog logarithmic amplifier.

10. The device as claimed in claim 1 wherein said various amplifiers, gates and counters are incorporated in a monolithic integrated circuit means.

11. The device as claimed in claim 1 wherein said density and exposure time measurement means is incorporated in a microprocessor application means.

12. The device as claimed in claim 5 wherein a switching transformer means coupled to transistor means and to an integrated circuit voltage regulator means provides a regulated high voltage for said photomultiplier tube.

13. The device as claimed in claim 1 wherein a plurality of said memory feedback potentiometer means or variable resistor means can be remotely switched into the circuit, providing a selection of said memory standard means for selected paper and negative emulsions.

14. The device as claimed in claim 1 wherein said voltage source coupled to said memory standard means through said selector switch means provides the capability of resetting said memory gains precisely by means of said LED digital readout means.

* * * * *